United States Patent
Yamamoto et al.

(10) Patent No.: US 11,715,822 B2
(45) Date of Patent: Aug. 1, 2023

(54) NEGATIVE ELECTRODE ACTIVE MATERIAL FOR NON-AQUEOUS ELECTROLYTE SECONDARY CELL, AND NON-AQUEOUS ELECTROLYTE SECONDARY CELL

(71) Applicant: Panasonic Intellectual Property Management Co., Ltd., Osaka (JP)

(72) Inventors: Norihisa Yamamoto, Osaka (JP); Yohei Uchiyama, Hyogo (JP); Tatsuya Akira, Osaka (JP); Kazuro Hayashida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 347 days.

(21) Appl. No.: 16/650,236

(22) PCT Filed: Sep. 26, 2018

(86) PCT No.: PCT/JP2018/035762
§ 371 (c)(1),
(2) Date: Mar. 24, 2020

(87) PCT Pub. No.: WO2019/065766
PCT Pub. Date: Apr. 4, 2019

(65) Prior Publication Data
US 2021/0202930 A1    Jul. 1, 2021

(30) Foreign Application Priority Data

Sep. 29, 2017 (JP) ................................ 2017-190855

(51) Int. Cl.
*H01M 4/36* (2006.01)
*H01M 4/38* (2006.01)
(Continued)

(52) U.S. Cl.
CPC ........... *H01M 4/364* (2013.01); *H01M 4/134* (2013.01); *H01M 4/136* (2013.01); *H01M 4/366* (2013.01);
(Continued)

(58) Field of Classification Search
None
See application file for complete search history.

(56) References Cited

U.S. PATENT DOCUMENTS

2007/0190413 A1    8/2007  Lee et al.
2016/0322637 A1    11/2016 Nakanishi et al.
(Continued)

FOREIGN PATENT DOCUMENTS

CN    105849953 A    8/2016
CN    107112534 A    8/2017
(Continued)

OTHER PUBLICATIONS

International Search Report dated Dec. 18, 2018, issued in counterpart International Application No. PCT/JP2018/035762 (1 page).
(Continued)

*Primary Examiner* — Zhongqing Wei
(74) *Attorney, Agent, or Firm* — WHDA, LLP (57) ABSTRACT

Negative electrode active material particles comprise base particles having: a silicate phase containing $Li_2O$, $SiO_2$, at least one oxide selected from $M^1_2O_3$, $M^2O_2$, $M^3_2O_5$, and $M^4O_3$ (where $M^1$, $M^2$, $M^3$, and $M^4$ are elements other than alkali metals, alkali earth metals, and Si), and a discretionary component MO (where M is an alkali earth metal); and silicon particles dispersed in the silicate phase. The element contents for the elements contained in the silicate phase are: 3-33 mol % of Li; 40-78 mol % of S; and 1-40 mol % of $M^1$, $M^2$, $M^3$, and $M^4$. If MO is contained, the M content in the silicate phase is 1-10 mol %.

8 Claims, 1 Drawing Sheet

(51) Int. Cl.
  *H01M 4/58*     (2010.01)
  *H01M 4/62*     (2006.01)
  *H01M 4/134*    (2010.01)
  *H01M 4/136*    (2010.01)
  *H01M 10/0525*  (2010.01)
  *H01M 4/02*     (2006.01)

(52) U.S. Cl.
  CPC ......... *H01M 4/386* (2013.01); *H01M 4/5825* (2013.01); *H01M 4/625* (2013.01); *H01M 10/0525* (2013.01); *H01M 2004/027* (2013.01)

(56) References Cited

U.S. PATENT DOCUMENTS

| | | | |
|---|---|---|---|
| 2017/0309950 A1* | 10/2017 | Minami | H01M 4/405 |
| 2017/0331108 A1  | 11/2017 | Minami et al. | |
| 2018/0287148 A1  | 10/2018 | Akira et al. | |
| 2018/0342757 A1* | 11/2018 | Choi | H01M 4/525 |

FOREIGN PATENT DOCUMENTS

| | | |
|---|---|---|
| JP | 2007-500421 A | 1/2007 |
| JP | 2011-233245 A | 11/2011 |
| JP | 2014-187005 A | 10/2014 |
| JP | 2015-125815 A | 7/2015 |
| JP | 2015-170438 A | 9/2015 |
| WO | 2016/121320 A1 | 8/2016 |
| WO | 2016/136180 A1 | 9/2016 |

OTHER PUBLICATIONS

Office Action dated Apr. 12, 2022, issued in counterpart JP Application No. 2019-545579, with partial English translation. (9 pages).
English Translation of Search Report dated Aug. 9, 2022, issued in counterpart CN Application No. 201880062431.7. (3 pages).

* cited by examiner

NEGATIVE ELECTRODE ACTIVE MATERIAL FOR NON-AQUEOUS ELECTROLYTE SECONDARY CELL, AND NON-AQUEOUS ELECTROLYTE SECONDARY CELL

TECHNICAL FIELD

The present disclosure relates to a negative electrode active material for a non-aqueous electrolyte secondary battery, and a non-aqueous electrolyte secondary battery.

BACKGROUND ART

It is known that silicon materials such as silicon (Si) and silicon oxide represented by $SiO_x$ can intercalate more lithium ions per unit volume than carbon materials such as graphite.

For example, Patent Literature 1 discloses a non-aqueous electrolyte secondary battery in which a mixture of $SiO_x$ and graphite is used as a negative electrode active material.

CITATION LIST

Patent Literature

PATENT LITERATURE 1: Japanese Unexamined Patent Application Publication No. 2011-233245

SUMMARY

It is desired that charge/discharge cyclic characteristics be improved in non-aqueous electrolyte secondary batteries in which silicon particles are used as a negative electrode active material.

Thus, an object of the present disclosure is to provide a negative electrode active material for non-aqueous electrolyte secondary batteries that can prevent deterioration in the charge/discharge cyclic characteristics of non-aqueous electrolyte secondary batteries in which silicon particles are used as a negative electrode active material; and a non-aqueous electrolyte secondary battery.

A negative electrode active material for a non-aqueous electrolyte secondary battery according to one aspect of the present disclosure comprises base particles, each of the base particles comprising: a silicate phase including Li, Si, and $M^X$, wherein $M^X$ is an element other than an alkali metal, an alkaline earth metal, or Si; and silicon particles dispersed in the silicate phase, wherein, in the silicate phase, a Li content is 3 to 45 mol %, a Si content is 40 to 78 mol %, and an $M^X$ content is 1 to 40 mol %, each based on the total amount of elements other than oxygen. When the silicate phase further includes an alkaline earth metal M, the M content is 1 to 10 mol %.

According to one aspect of the present disclosure, the deterioration in the charge/discharge cyclic characteristics can be prevented in non-aqueous electrolyte secondary batteries in which silicon particles are used as a negative electrode active material.

DESCRIPTION OF EMBODIMENTS

When silicon particles are used as a negative electrode active material, the following reactions occur upon charge/discharge of the battery, for example.

Charge: $Si + 4Li^+ + 4e^- \rightarrow Li_4Si$

Discharge: $Li_4Si \rightarrow Si + 4Li^+ + 4e^-$

Generally, because the volume change of the silicon particles due to the charge/discharge reaction is large, the particle structure is broken through repeated charge/discharge cycles to thereby deteriorate charge/discharge cyclic characteristics of the battery. As a result of diligent studies by the present inventors, it has been found that when silicon particles are dispersed in a silicate phase having a high hardness (e.g., Vickers hardness) and high ion conductivity, the volume change of the silicon particles due to the charge/discharge reaction is reduced, to thereby prevent the breakage of the particle structure, thus conceiving the negative electrode active material for a non-aqueous electrolyte secondary battery of an aspect described below.

The negative electrode active material for a non-aqueous electrolyte secondary battery according to one aspect of the present disclosure comprises base particles, each of the base particles comprising: a silicate phase including Li, Si, and $M^X$, wherein $M^X$ is an element other than an alkali metal, an alkaline earth metal, or Si; and silicon particles dispersed in the silicate phase, wherein, in the silicate phase, a Li content is 3 to 45 mol %, a Si content is 40 to 78 mol %, and an $M^X$ content is 1 to 40 mol %, each based on the total amount of elements other than oxygen; and when the silicate phase includes an alkaline earth metal M, the M content is 1 to 10 mol %. Such a silicate phase has a high Vickers hardness (e.g., 648 Hv or more) and high ion conductivity. Therefore, in this silicate phase, the volume change of the silicon particles dispersed therein due to the charge/discharge reaction is reduced to thereby prevent breakage of the particle structure through the charge/discharge cycle, and thus, deterioration in the charge/discharge cyclic characteristics of the battery can be prevented.

Hereinafter, exemplary embodiments will be described in detail. The drawing referred to for the description of embodiments is a schematic illustration, and the dimensions, the proportions, and the like of the components illustrated in the drawing may be different from those of actual products. Specific dimensions, proportio, and the like should be determined in consideration of the description below.

A non-aqueous electrolyte secondary battery as an exemplary embodiment comprises: a negative electrode including the negative electrode active material described above, a positive electrode, and a non-aqueous electrolyte. A separator is preferably disposed between the positive electrode and the negative electrode. In an exemplary structure of the non-aqueous electrolyte secondary battery, an exterior body houses an electrode assembly formed by winding the positive electrode and the negative electrode together with the separator therebetween, and the non-aqueous electrolyte. Instead of the electrode assembly having the wound structure, an electrode assembly of another type may be applied, including an electrode assembly having a laminated structure formed by alternately laminating positive electrodes and negative electrodes with separators therebetween. The non-aqueous electrolyte secondary battery may be any form including a cylindrical shape, a rectangular shape, a coin shape, a button shape, and a laminated shape.

[Positive Electrode]

The positive electrode preferably includes a positive electrode current collector, such as a metal foil, and a positive electrode mixture layer formed on the current collector. Foil of a metal that is stable in the electric potential range of the positive electrode, such as aluminum, a film with such a metal disposed as an outer layer, and the like, can be used for the positive electrode current collector. The positive electrode mixture layer preferably includes a positive electrode active material as well as a conductive agent and a binder. The surface of the particle of the positive electrode active material may be coated with micro particles of an oxide such as aluminum oxide ($Al_2O_3$) or an inorganic compound such as a phosphoric acid compound or a boric acid compound.

Examples of the positive electrode active material include a lithium transition metal oxide, which contains a transition metal element such as Co, Mn, or Ni. Examples of the lithium transition metal oxide include $Li_xCoO_2$, $Li_xMnO_2$, $Li_xCo_yNi_{1-y}O_2$, $Li_xCo_yM_{1-y}O_z$, $Li_xNi_{1-y}M_yO_z$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq 2.3$). These may be used singly, or two or more thereof may be mixed and used.

Examples of the conductive agent include carbon materials such as carbon black, acetylene black, Ketjen black, and graphite. These may be used singly or in combinations of two or more thereof.

Examples of the binder include fluoro resins, such as polytetrafluoroethylene (PTFE) and poly(vinylidene fluoride) (PVdF), polyacrylonitrile (PAN), polyimide resins, acrylic resins, and polyolefin resins. These resins may be combined with carboxymethyl cellulose (CMC) or a salt thereof (e.g., CMC-Na, CMC-K, or CMC-$NH_4$ which may be a partially neutralized salt), poly(ethylene oxide) (PEO), or the like. These may be used singly or in combinations of two or more thereof.

[Negative Electrode]

The negative electrode preferably includes a negative electrode current collector, such as a metal foil, and a negative electrode mixture layer formed on the current collector. Foil of a metal that is stable in the electric potential range of the negative electrode, such as copper, a film with such a metal disposed as an outer layer, and the like, can be used for the negative electrode current collector. The negative electrode mixture layer preferably includes a negative electrode active material as well as a binder. As the binder, fluoro resins, PAN, polyimide resins, acrylic resins, polyolefin resins, and the like, can be used, as in the positive electrode. When a mixture slurry is prepared using an aqueous solvent, CMC or a salt thereof (e.g., CMC-Na, CMC-K, or CMC-$NH_4$ which may be a partially neutralized salt), styrene-butadiene rubber (SBR), poly(acrylic acid) (PAA) or a salt thereof (e.g., PAA-Na or PAA-K which may be a partially neutralized salt), poly(vinyl alcohol) (PVA), or the like is preferably used.

Figure 1:
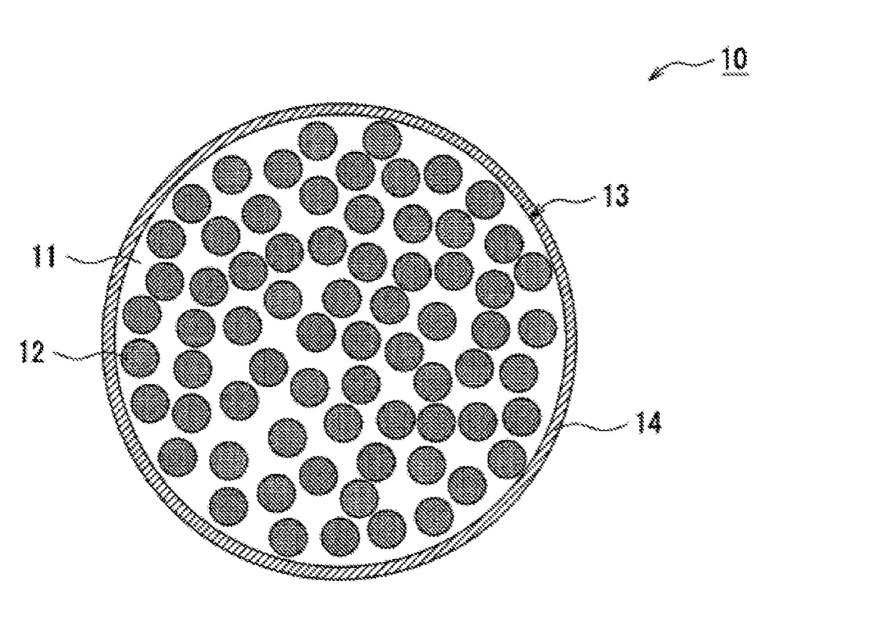
FIG. 1 is a sectional view schematically illustrating a particle of the negative electrode active material as an exemplary embodiment.

FIG. 1 shows a sectional view of a particle of the negative electrode active material as an exemplary embodiment. A particle 10 of the negative electrode active material shown in FIG. 1 comprises a base particle 13 comprising a silicate phase 11 and silicon particles 12 dispersed in the phase. The base particle 13 has a sea/island structure in which fine silicon particles 12 are dispersed in the silicate matrix, for example. The particle 10 of the negative electrode active material shown in FIG. 1 preferably has a conductive layer 14 formed on the surface of the base particle 13.

The silicon particles 12 can intercalate more lithium ions than carbon materials such as graphite, and thus contribute to a larger capacity of a battery when the particles 10 of the negative electrode active material are applied as a negative electrode active material. The particles 10 of the negative electrode active material may be used alone as a negative electrode active material to the negative electrode mixture layer, or may be combined with another active material. For example, a carbon material such as graphite is preferable as the other active material. When a carbon material is combined therewith, the mass ratio of the particles 10 of the negative electrode active material and the carbon material is preferably 1:99 to 30:70 in view of, for example, a larger capacity and the improvement in the charge/discharge cyclic characteristics.

The content of the silicon particles 12 in the base particle 13 is preferably 20 mass % to 95 mass % and more preferably 35 mass % to 75 mass % based on the total mass of the base particle 13 in view of, for example, a larger capacity and the improvement in the cyclic characteristics. If the content of the silicon particles 12 is too low, the charge/discharge capacity decreases, for example, and also diffusion of lithium ions may be poor which causes deterioration in loading characteristics. If the content of the silicon particles 12 is too high, the effect of preventing the deterioration in the charge/discharge cyclic characteristics may be reduced, for example.

The average particle size of the silicon particles 12 is, for example, 500 nm or less, preferably 200 nm or less, and more preferably 50 nm or less, before the first charge, and preferably 400 nm or less, and more preferably 100 nm or less, after charge/discharge. Fine silicon particles 12 exhibit a reduced volume change thereof upon charge/discharge and are thus likely to prevent the breakage of the electrode structure. The average particle size of the silicon particles 12 is determined through observation of the cross section of the particles 10 of the negative electrode active material using a scanning electron microscope (SEM) or a transmission electron microscope (TEM), and specifically, is obtained by averaging the longest particle diameters of one hundred silicon particles 12.

The silicate phase 11 includes Li, Si, and $M^x$, wherein $M^x$ is an element other than an alkali metal, an alkaline earth metal, or Si. In the silicate phase 11, the Li content is 3 to 45 mol %, the Si content is 40 to 78 mol %, and the $M^x$ content is 1 to 40 mol %, each based on the total amount of elements other than oxygen. M is an element for an optional component MO, which may be included in the silicate phase 11, and M is an alkaline earth metal. As stated hereinbefore, the silicate phase 11 has a high Vickers hardness and high ion conductivity. In such a silicate phase 11, the volume change of the silicon particles 12 dispersed therein due to the charge/discharge reaction is reduced to thereby prevent the breakage of the particle structure through the charge/discharge cycle, and thus, the deterioration in the charge/discharge cyclic characteristics of the battery can be prevented. $M^x$ is any one of $M^1$, $M^2$, $M^3$, and $M^4$, and $M^1$, $M^2$, $M^3$, and $M^4$ are elements for $M^1_2O_3$, $M^2O_2$, $M^3_2O_5$, and $M^4O_3$, respectively. Thus, it can be considered that the silicate phase 11 has a structure in which $Li_2O$, $SiO_2$, oxides including $M^1_2O_3$, $M^2O_2$, $M^3_2O_5$, and $M^4O_3$, and the like are bonded to each other.

In view of, for example, reliably preventing the deterioration in the charge/discharge cyclic characteristics, the Li content of the silicate phase 11 is preferably 5 to 23 mol %, the Si content of the silicate phase 11 is preferably 45 to 78 mol %, and the content of $M^1$, $M^2$, $M^3$, and $M^4$ in the silicate phase 11 is preferably 2 to 35 mol %, each based on the total amount of elements other than oxygen.

It is preferable that the silicate phase 11 includes $M^1$ as a result of, for example, adding $M^1{}_2O_3$ and sintering the resultant to produce the silicate phase 11. Specifically, it is preferable that the silicate phase 11 include any one element of Al, B, Bi, La, and Sb as a result of adding as $M^1{}_2O_3$ at least any one of $Al_2O_3$, $B_2O_3$, $Bi_2O_3$, $La_2O_3$, and $Sb_2O_3$ and sintering the resultant. Through adding the oxide and sintering the resultant, the hardness (e.g., Vickers hardness) or the ion conductivity of the silicate phase 11 may increase to thereby reliably prevent the deterioration in the charge/discharge cyclic characteristics, or obtain a larger capacity of the battery.

It is preferable that the silicate phase 11 includes $M^2$ as a result of, for example, adding $M^2O_2$ and sintering the resultant to produce the silicate phase 11. Specifically, it is preferable that the silicate phase 11 include any one element of Zr, Ge, and Ti as a result of adding as $M^2O_2$ at least any one of $ZrO_2$, $GeO_2$, and $TiO_2$ and sintering the resultant. Due to including the oxide, the hardness (e.g., Vickers hardness) or the ion conductivity of the silicate phase 11 may increase to thereby reliably prevent the deterioration in the charge/discharge cyclic characteristics or obtain a larger capacity of the battery.

It is preferable that the silicate phase 11 includes $M^3$ as a result of, for example, adding $M^3{}_2O_5$ and sintering the resultant to produce the silicate phase 11. Specifically, it is preferable that the silicate phase 11 include any one element of P and V as a result of adding as $M^3{}_2O_5$ at least any one of $P_2O_5$ and $V_2O_5$ and sintering the resultant. Due to including the oxide, the hardness (e.g., Vickers hardness) or the ion conductivity of the silicate phase 11 may increase to thereby securely prevent the deterioration in the charge/discharge cyclic characteristics or obtain a larger capacity of the battery.

It is preferable that the silicate phase 11 includes $M^4$ as a result of, for example, adding $M^4O_3$ and sintering the resultant to produce the silicate phase 11. Specifically, it is preferable that the silicate phase 11 include W as a result of adding $WO_3$ as $M^4O_3$ and sintering the resultant. Due to including the oxide, the hardness (e.g., Vickers hardness) or the ion conductivity of the silicate phase 11 may increase to thereby reliably prevent the deterioration in the charge/discharge cyclic characteristics or obtain a larger capacity of the battery.

The silicate phase 11 may include an alkaline earth metal M as a result of, for example, adding MO, wherein M is an alkaline earth metal, and sintering the resultant. When the silicate phase 11 includes M, the M content of the silicate phase 11 is 1 to 10 mol % and preferably 1 to 5 mol % based on the total amount of elements other than oxygen. If the M content of the silicate phase 11 is more than 10 mol %, the ion conductivity may decrease to thereby fail to sufficiently prevent deterioration in the charge/discharge cyclic characteristics.

When the silicate phase 11 includes an alkaline earth metal M, M includes at least one of Be, Mg, Ca, Sr, Ba, Ra, Pb, and Cu. In this case, the silicate phase 11 can be produced through, for example, adding as MO at least any one of BeO, MgO, CaO, SrO, BaO, RaO, PbO, and CuO and sintering the resultant. When the content of the oxide is less than the given value, the hardness (e.g., Vickers hardness) or the ion conductivity of the silicate phase 11 may increase to thereby reliably prevent deterioration in the charge/discharge cyclic characteristics or obtain a larger capacity of the battery.

The content of each element included in the silicate phase 11 can be determined in the following manner, for example.

First, a sample of the silicate phase 11 is thoroughly dissolved in a hot acid solution (mixed acid of hydrofluoric acid, nitric acid, and sulfuric acid), and carbon that is the insoluble residue is removed by filtration. The filtrate obtained is analyzed by inductively coupled plasma atomic emission spectroscopy (ICP-AES) to determine the spectral intensity of each metal element. A calibration curve is prepared using commercially available standard solutions of metal elements, and the content of each metal element included in the silicate phase 11 is calculated on the calibration curve. The contents of silicon and boron are determined in the same manner as above, except that the sample is melted with sodium carbonate, followed by filtration.

The content of each metal oxide in the silicate phase 11 can be estimated, for example, from the content of each metal element determined as above. For example, in the case where the metal element is Al, the amount of $Al_2O_3$ calculated on the assumption that all Al forms $Al_2O_3$ is taken as the amount of the Al oxide assumed. In the case where the metal element is Ca, the amount of CaO calculated on the assumption that all Ca forms CaO is taken as the amount of the Ca oxide assumed.

The Vickers hardness of the silicate phase 11 can be determined in the following manner. The silicate phase 11 is embedded in a thermosetting resin, and the resultant is rubbed with sandpaper #400 to allow the cross section of the silicate phase 11 to exposed. The cross section is mirror-finished by rubbing with sandpaper #2000 and buffing. Since the silicate phase 11 may dissolve into water, rubbing and buffing are carried out without water. The Vickers hardness on the cross section after finishing is determined using a Vickers hardness tester under a load of 1 kg for a retention time of 15 seconds.

The average particle size of the particles 10 of the negative electrode active material is preferably 1 to 15 µm, and more preferably 4 to 10 µm in view of, for example, higher capacity and improvement in the cyclic characteristics. The average particle size of the particles 10 of the negative electrode active material herein is the particle size of the primary particle and means a diameter (a volume average particle size) at an integrated volume of 50% in the particle size distribution analyzed according to the laser diffraction/scattering method (using, for example, "LA-750" manufactured by HORIBA, Ltd.). If the average particle size of the particles 10 of the negative electrode active material is too small, the surface area thereof is larger, and therefore the amount thereof reacting with an electrode is likely to be larger, resulting in decrease in capacity. On the other hand, if the average particle size of the particles 10 of the negative electrode active material is too large, the change in the volume due to charge/discharge may be larger, sometimes resulting in reduction in the effect of preventing decrease in charge/discharge cyclic characteristics. It is preferable to form a conductive layer 14 on the surface of the particles 10 (base particle 13) of the negative electrode active material. However, the thickness of the conductive layer 14 is so small that it has no influence on the average particle size of the particles 10 of the negative electrode active material (the particle size of the particle 10 of the negative electrode active material≈the particle size of the base particle 13).

The base partiCles 13 are produced through, for example, the following steps 1 to 4. The following steps are each preferably performed in an inert atmosphere, although step 1 can be conducted in atmospheric air.

(1) Predetermined amounts of a Li material; a Si material; a material including at least any one of an $M^1$ material, an $M^2$ material, an $M^3$ material, and an $M^4$ material; and an M material are mixed, and the mixture is heated and melted. The melt is made into flakes through metal rollers to produce silicate. Then, the silicate flakes are heat-treated for crystallization in atmospheric air at a temperature of the glass transition point or more and the melting point or less. Alternately, the silicate flakes may he used without undergoing crystallization. The mixture obtained by mixing the predetermined amounts of the materials may be fired at a temperature equal to or less than the crystal melting point without undergoing melting, to thereby produce silicate through a solid-phase reaction. Examples of the Li material include lithium oxide, lithium carbonate, and lithium hydroxide. Examples of the Si material include silicon oxide. Examples of the $M^1$ material, the $M^2$ material, the $M^3$ material, and the $M^4$ material include an oxide, a hydroxide, and a carbonate compound of an element other than an alkali metal, an alkaline earth metal, or Si. Examples of the M material include an oxide, a hydroxide, and a carbonate compound of an alkaline earth metal. It is preferable to avoid contaminating the silicate with an alkali metal other than lithium as much as possible, because the coexistence of the silicate with an alkali metal other than lithium, such as sodium or potassium, decreases the ion conductivity. However, in the case where the silicate is contaminated with any alkali metal other than lithium as an inevitable impurity, about 3 mol % or less of the alkali metal is acceptable because it does not greatly adversely affect the battery performance.

(2) A silicate powder obtained by grinding the silicate described above to the average particle size of approximately several micrometers to several tens of micrometers and Si powder having an average particle size of approximately several micrometers to several tens of micrometers are mixed in a weight ratio of, for example, 20:80 to 95:5 to produce a mixture.

(3) Then, the mixture is ground for atomization in a ball mill. Alternatively, the material powders may each be atomized and then mixed to produce a mixture. The time duration for the grinding treatment is a duration such that the crystallite size of the ground powder becomes 25 nm or less, the crystallite size of the ground powder being calculated by Scherrer equation from the half width of the diffraction peak of the Si (111) plane in the XRD pattern obtained by XRD measurement on the ground powder. The specific conditions etc. for the measurement of the crystallite size are as follows.

Measurement system: In-plane multipurpose X-ray diffraction system Ultima IV (manufactured by Rigaku Corporation)
    Analytical software: one-stop full-function powder X-ray diffraction analysis software PDXL (manufactured by Rigaku Corporation)
    Measurement conditions: 20 to 90°, using a diffraction peak of Si(111) plane (2θ=28 to 29°), 5000 counts or more at the top of the peak
    Anticathode: Cu—Kα
    Tube current/voltage: 40 mA/40 kV
    Counting time: 1.0 s
    Divergence slit: 2/3°
    Vertical divergence limiting slit: 10 mm
    Scattering slit: 2/3°
    Light receiving slit: 0.3 mm
    Sample spinning: 60 rpm (4) The ground mixture is heat-treated at, for example, 600 to 1000° C. In this heat treatment, pressure may be applied to the mixture, as in hot press, to produce a sintered compact of the mixture. The Si powder and the silicate powder may be mixed and heat-treated without using a ball mill to produce base particles 13.

The silicate produced in step (1) is for forming the silicate phase 11 described above and has high Vickers hardness. Thus, the silicate powder having a high hardness is brought into contact with the Si powder in step (3), and the Si powder is therefore easily atomized. Thus, the time required for reaching the prescribed atomization level can be shortened.

The conductive material for forming the conductive layer 14 is preferably electrochemically stable, and is preferably at least one selected from the group consisting of a carbon material, a metal, and a metal compound. As the carbon material, carbon black, acetylene black, ketjen black, graphite, and a mixture of two or more thereof can be used, as in the conductive material for the positive electrode mixture layer. As the metal, copper, nickel, and an alloy thereof that is stable in the electric potential range of the negative electrode can be used. Examples of the metal compounds include a copper compound and a nickel compound (a metal or metal compound layer can be formed on the surface of the base particle 13 by, for example, nonelectrolytic plating). Among these, the carbon material is particularly preferably used.

Examples of the method for coating the surface of the base particle 13 with the carbon material include a CVD method involving using acetylene, methane, or the like, and a method in which the base particles 13 are mixed and heat-treated with coal pitch, petroleum pitch, a phenol resin, or the like. Alternatively, carbon black, ketjen black, or the like may be adhered to the surface of the base particles 13 with a binder.

Preferably, almost the whole area of the surface of the base particle 13 is covered with the conductive layer 14. The thickness of the conductive layer 14 is preferably 1 to 200 nm and more preferably 5 to 100 nm in view of ensuring the conductivity and the diffusibility of lithium ions into the base particles 13. If the thickness of the conductive layer 14 is too small, the conductivity decreases, and it is also difficult to uniformly cover the base particles 13. On the other hand, if the thickness of the conductive layer 14 is too large, there is a tendency for the diffusion of the lithium ions into the base particles 13 to be inhibited, which decreases the capacity. The thickness of the conductive layer 14 can be measured through observation of the cross section of the particle using SEM, TEM or the like.

[Non Aqueous Electrolyte]

The non-aqueous electrolyte includes a non-aqueous solvent and an electrolyte salt dissolved in the non-aqueous solvent. The non-aqueous electrolyte is not limited to a liquid electrolyte (non-aqueous electrolyte solution), and may be a solid electrolyte using a gel polymer or the like. As the non-aqueous solvent, esters, ethers, nitriles such as acetonitrile, amides such as dimethylformamide, and mixed solvents of two or more thereof can be used. The non-aqueous solvent may contain a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate; chain carbonate esters, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone (GBL) and γ-valerolactone (GVL); and chain carboxylate esters such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Examples of the halogen-substituted product preferable for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where 1<x<6, and n is 1 or 2), $LiB_{10}Cl_{10}$, LiCl, LiBr, LiI, chloroborane lithium, lithium short-chain aliphatic carboxylates; borate salts such as $Li_2B_4O_7$ and $Li(B(C_2O_4)F_2)$; and imide salts such as $LiN(SO_2CF_3)_2$ and $LiN(C_lF_{2l+1}SO_2)(C_mF_{2m+1}SO_2)$ (where l and m are integers of 0 or more). These lithium salts may be used singly, or two or more thereof may be mixed and used. Among these, $LiPF_6$ is preferably used in view of ionic conductivity, electrochemical stability, and other properties. The concentration of the lithium salt is preferably 0.8 to 1.8 mole per 1 L of the non-aqueous solvent.

[Separator]

An ion-permeable and insulating porous sheet is used as the separator. Specific examples of the porous sheet include a microporous thin film, woven fabric, and nonwoven fabric. Suitable examples of the material for the separator include olefin resins such as polyethylene and polypropylene, and cellulose. The separator may be a laminate including cellulose fiber layer and a layer of fibers of a thermoplastic resin such as an olefin resin.

EXAMPLES

Hereinafter, the present disclosure will be described in more detail by way of Examples, but the present disclosure is not limited thereby.

Example 1

[Production of Negative Electrode Active Material]

Lithium oxide, silicon dioxide, calcium oxide, boron oxide, and aluminum oxide were mixed in a molar ratio of $Li_2O/SiO_2/CaO/B_2O_3/Al_2O_3=22/72/1/2/3$. The resulting mixture was melted in an inert atmosphere at 1500° C. for 5 hours, and the melt was passed through metal rollers to obtain flakes. The flakes were heat-treated for crystallization at 750° C. for 5 hours to produce silicate including Li, Si, Ca, B, and Al. The silicate had a Vickers hardness of 708 Hv.

The silicate was ground to an average particle size of 10 μm to obtain a silicate powder. In an inert atmosphere, a Si powder (3N, 10 μm ground product) and the silicate powder were mixed in a mass ratio of 42:58 and placed in a pot (made of SUS, volume: 500 mL) of a planetary ball mill (P-5, manufactured by FRITSCH). Twenty four SUS balls (diameter: 20 mm) were placed in the pot, and a lid was put thereon, followed by grinding treatment at 200 rpm for 25 hours. Then, the resulting powder was taken out in an inert atmosphere, and heat-treated in conditions of a temperature of 600° C. for 4 hours in an inert atmosphere. The heat-treated powder (hereinafter, referred to as base particles) was ground and passed through a 40-μm mesh, and the resulting powder was mixed with coal pitch (MCP 250, manufactured by JFE Chemical Corporation). The mixture was heat-treated in conditions of a temperature of 800° C. for 5 hours in an inert atmosphere to coat the surface of each base particle with carbon, thereby forming a conductive layer. The amount of the carbon coating was 5 mass % based on the total mass of the particle composed of the base particle and the conductive layer. The resultant was then conditioned using a sieve so as to have an average particle size of 5 μm, thereby obtaining a negative electrode active material.

[Analysis of Negative Electrode Active Material]

As the result of the observation with SEM on the cross sections of the particles of the negative electrode active material, the Si particles were found to have an average particle size of less than 100 nm. The content of each element in the silicate phase was calculated through ICP emission spectral analysis. It is necessary for Si particles to be distinguished from the Si element in the silicate phase so that the content of Si element in the silicate phase is calculated so as not to include Si particles. Specifically, it was calculated in the following manner. First, the amount of Si included in the whole of the negative electrode active material was determined through ICP emission spectral analysis. Then, Si particles dispersed in the lithium silicate phase were heated for crystallization in a vacuumed atmosphere at 930° C. for 10 hours, and the resulting powder was subjected to XRD analysis. The Si content was calculated from the integrated value of Si peaks in the XRD analysis. From the measurement results, the amount of Si element in the lithium silicate phase was determined by arithmetic operation. The contents of Li, Si, Ca, B, and Al elements in the silicate phase were 34.6 mol %, 56.7 mol %, 0.8 mol %, 3.1 mol %, and 4.7 mol %, respectively.

[Preparation of Negative Electrode]

Next, the above-described negative electrode active material and polyacrylonitrile (PAN) were mixed in a mass ratio of 95:5, and N-methyl-2-pyrrolidone (NMP) was added thereto. The resulting mixture was then stirred using a mixer (THINKY MIXER Awatori-Rentaroh, manufactured by THINKY CORPORATION) to prepare a negative electrode mixture slurry. Then, the slurry was applied to one side of a copper foil so that the mass of the negative electrode mixture layer was 25 g per m². The coating was dried at 105° C. in atmospheric air, and then rolled to produce a negative electrode. The packing density of the negative electrode mixture layer was 1.50 g/cm³.

[Preparation of Non-aqueous Electrolyte Solution]

Ethylene carbonate (EC) and diethyl carbonate (DEC) were mixed in a volume ratio of 3:7. $LiPF_6$ was added to the mixed solvent to a concentration of 1.0 mol/L to thereby prepare a non-aqueous electrolyte solution.

[Production of Non-Aqueous Electrolyte Secondary Battery]

In an inert atmosphere, the negative electrode described above and a lithium metal foil each having a Ni tab attached thereto were disposed opposite to each other with a polyethylene separator interposed therebetween to thereby form an electrode assembly. The electrode assembly was then housed in a battery exterior body made of an aluminum-laminated film, and the non-aqueous electrolyte solution was injected to the battery case. The battery exterior body was sealed to thereby prepare a non-aqueous electrolyte secondary battery.

Example 2

A silicate including Li, Si, B, and Al was produced in the same manner as in Example 1, except that lithium oxide, silicon dioxide, boron oxide, and aluminum oxide were mixed in a molar ratio of $Li_2O/SiO_2/B_2O_3/Al_2O_3=22/68/10/10$. The silicate had a Vickers hardness of 742 Hv.

A negative electrode active material and a non-aqueous electrolyte secondary battery were produced in the same manner as in Example 1, except that the above-described silicate was used, and the time duration of the grinding treatment with a ball mill was 19 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, B, and Al contents were found to be 28.9 mol %, 44.7 mol %, 13.2 mol %, and 13.2 mol %, respectively.

Example 3

A silicate including Li, Si, B, and Al was produced in the same manner as in Example 1, except that lithium oxide, silicon dioxide, boron oxide, and aluminum oxide were mixed in a molar ratio of $Li_2O/SiO_2/B_2O_3/Al_2O_3=22/48/15/15$. The silicate had a Vickers hardness of 753 Hv.

A negative electrode active material and a non-aqueous electrolyte secondary battery were produced in the same manner as in Example 1, except that the above-described silicate was used, and the time duration of the grinding treatment with a ball mill was 18 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, B, and Al contents were found to be 28.9 mol %, 31.6 mol %, 19.7 mol %, and 19.7 mol %, respectively.

Example 4

A silicate including Li, Si, and Mg was produced in the same manner as in Example 1, except that lithium oxide, silicon dioxide, and magnesium oxide were mixed in a molar ratio of $Li_2O/SiO_2/MgO=22/73/5$. The silicate had a Vickers hardness of 710 Hv.

A negative electrode active material and a non-aqueous electrolyte secondary battery were produced in the same manner as in Example 1, except that the above-described silicate was used, and the time duration of the grinding treatment with a ball mill was 26 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, and Mg contents were found to be 36.1 mol %, 59.8 mol %, and 4.1 mol %, respectively.

Example 5

A silicate including Li, Si, and Zr was produced in the same manner as in Example 1, except that lithium oxide, silicon dioxide, and zirconium oxide were mixed in a molar ratio of $Li_2O/SiO_2/ZrO_2=22/73/5$. The silicate had a Vickers hardness of 740 Hv.

A negative electrode active material and a non-aqueous electrolyte secondary battery were produced in the same manner as in Example 1, except that the above-described silicate was used, and the time duration of the pinding treatment with a ball mill was 20 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, and Zr contents were found to be 36.1 mol %, 59.8 mol %, and 4.1 mol %, respectively.

Example 6

A silicate including Li, Si, and Ti was produced in the same manner as in Example 1, except that lithium oxide, silicon dioxide, and titanium oxide were mixed in a molar ratio of $Li_2O/SiO_2/TiO_2=22/73/5$. The silicate had a Vickers hardness of 680 Hv.

A negative electrode active material and a non-aqueous electrolyte secondary battery were produced in the same manner as in Example 1, except that the above-described silicate was used, and the time duration of the grinding treatment with a ball mill was 32 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, and Ti contents were found to be 36.1 mol %, 59.8 mol %, and 4.1 mol %, respectively.

Example 7

A silicate including Li, Si, and P was produced in the same manner as in Example 1, except that lithium oxide, silicon dioxide, and phosphorus pentoxide were mixed in a molar ratio of $Li_2O/SiO_2/P_2O_5=22/73/5$. The silicate had a Vickers hardness of 600 Hv.

A negative electrode active material and a non-aqueous electrolyte secondary battery were produced in the same manner as in Example 1, except that the above-described silicate was used, and the time duration of the grinding treatment with a ball mill was 40 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, and P contents were found to be 34.6 mol %, 57.5 mol %, and 7.9 mol %, respectively.

Example 8

A silicate including Li, Si, and W was produced in the same manner as in Example 1, except that lithium oxide, silicon dioxide, and tungsten oxide were mixed in a molar ratio of $Li_2O/SiO_2/WO_3=22/73/5$. The silicate had a Vickers hardness of 650 Hv.

A negative electrode active material and a non-aqueous electrolyte secondary battery were produced in the same manner as Example 1, except that the above-described silicate was used, and the time duration of the grinding treatment with a ball mill was 35 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, and W contents were found to be 36.1 mol %, 59.8 mol %, and 4.1 mol %, respectively.

Example 9

A silicate including Li, Si, and La was prepared in the same manner as in Example 1, except that lithium oxide, silicon dioxide, and lanthanum oxide were mixed in a molar ratio of $Li_2O/SiO_2/La_2O_3=22/73/5$. The silicate had a Vickers hardness of 720 Hv.

A negative electrode active material and a non-aqueous electrolyte secondary battery were produced in the same manner as in Example 1, except that the above-described silicate was used, and the time duration of the grinding treatment with a ball mill was 20 hours. As the result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, and La contents were found to be 34.6 mol %, 57.5 mol %, and 7.9 mol %, respectively.

Example 10

A silicate including Li, Si, Ca, B, Al, and La was produced in the same manner as in Example 1, except that lithium oxide, silicon dioxide, calcium oxide, boron oxide, aluminum oxide, and lanthanum oxide were mixed in a molar ratio of $Li_2O/SiO_2/CaO/B_2O_3/Al_2O_3/La_2O_3=21/70/1/2/3/3$. The silicate had a Vickers hardness of 735 Hv.

A negative electrode active material and a non-aqueous electrolyte secondary battery were produced in the same manner as in Example 1, except that the above-described silicate was used, and the time duration of the grinding treatment with a ball mill was 20 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, Ca, B, Al, and La contents were found to be 32.6 mol %, 54.3 mol %, 0.8 mol %, 3.1 mol %, 4.7 mol %, and 4.7 mol %, respectively.

Example 11

A silicate including Li, Si, Ca, Mg, B, Al, Zr, Ti, P, and W was produced in the same manner as in Example 1, except that lithium oxide, silicon dioxide, calcium oxide, magnesium oxide, boron oxide, aluminum oxide, zirconium oxide, titanium oxide, phosphorus pentoxide, and tungsten oxide were mixed in a molar ratio of $Li_2O/SiO_2/CaO/MgO/B_2O_3/Al_2O_3/ZrO_2/TiO_2/P_2O_5/WO_3=22/55/2/3/5/5/1/1/5/1$. The silicate had a Vickers hardness of 733 Hv.

A negative electrode active material and a non-aqueous electrolyte secondary battery were produced in the same condition as in Example 1, except that the above-described silicate was used, and the time duration of the grinding treatment with a ball mill was 23 hours. As the result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, Ca, Mg, B, Al, Zr, Ti, P, and W contents were found to be 32.1 mol %, 40.1 mol %, 1.5 mol %, 2.2 mol %, 7.3 mol %, 7.3 mol %, 0.7 mol %, 0.7 mol %, 7.3 mol %, and 0.7 mol %, respectively.

Example 12

A silicate including Li, Si, B, and Al was produced in the same manner as in Example 1, except that lithium oxide, silicon dioxide, boron oxide, and aluminum oxide were mixed in a molar ratio of $Li_2O/SiO_2/B_2O_3/Al_2O_3=15/65/10/10$. The silicate had a Vickers hardness of 750 Hv.

A negative electrode active material and a non-aqueous electrolyte secondary battery were produced in the same manner as in Example 1, except that the above-desciibed silicate was used and the time duration of the grinding treatment with a ball mill was 17 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, B, and Al contents were found to be 22.2. mol %, 48.1 mol %, 14.8 mol %, and 14.8 mol %, respectively.

Example 13

A silicate including Li, Si, B, and Al was produced in the same manner as in Example 1, except that lithium oxide, silicon dioxide, boron oxide, and aluminum oxide were mixed in a molar ratio of $Li_2O/SiO_2/B_2O_3/Al_2O_3=8/72/10/10$. The silicate had a Vickers hardness of 763 Hv.

A negative electrode active material and a non-aqueous electrolyte secondary battery were produced in the same manner as in Example 1, except that the above-described silicate was used, and the time duration of the grinding treatment with a ball mill was 16 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, B, and Al contents were found to be 12.5 mol %, 56.3 mol %, 15.6 mol %, and 15.6 mol %, respectively.

Example 14

A silicate including Li, Si, B, and Al was produced in the same manner as in Example 1, except that lithium oxide, silicon dioxide, boron oxide, and aluminum oxide were mixed in a molar ratio of $Li_2O/SiO_2/B_2O_3/Al_2O_3=3/77/10/10$. The silicate had a Vickers hardness of 770 Hv.

A negative electrode active material and a non-aqueous electrolyte secondary battery were produced in the same manner as in Example 1, except that the above-described silicate was used, and the time duration of the grinding treatment with a ball mill was 15 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, B, and Al contents were found to be 4.9 mol %, 62.6 mol %, 16.3 mol %, and 16.3 mol %, respectively.

Example 15

A silicate including Li, Si, and B was produced in the same manner as in Example 1, except that lithium oxide, silicon dioxide, and boron oxide were mixed in a molar ratio of $Li_2O/SiO_2/B_2O_3=33/47/20$. The silicate had a Vickers hardness of 658 Hv.

A negative electrode active material and a non-aqueous electrolyte secondary battery were produced in the same manner as in Example 1, except that the above-described silicate was used, and the time duration of the grinding treatment with a ball mill was 35 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li, Si, and B contents were found to be 43.1 mol %, 30.7 mol %, and 26.1 mol %, respectively.

Comparative Example 1

A silicate including Li and Si was produced in the same manner as in Example 1, except that lithium oxide and silicon dioxide were mixed in a molar ratio of $Li_2O/SiO_2=50/50$. The silicate had a Vickers hardness of 481 Hv.

A negative electrode active material and a non-aqueous electrolyte secondary battery were produced in the same condition as in Example 1, except that the above-described silicate was used, and the tune duraticai of the grinding treatment with a ball mill was 50 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li and Si contents Were found to be 66.7 mol % and 33.3 mol %, respectively.

Comparative Example 2

A silicate including Li and Si was produced in the same manner as in Example 1, except that lithium oxide and silicon dioxide were mixed in a molar ratio of $Li_2O/SiO_2=33/67$. The silicate had a Vickers hardness of 544 Hv.

A negative electrode active material and a non-aqueous electrolyte secondary battery were produced in the same manner as in Example 1, except that the above-described silicate was used, and the time duration of the grinding treatment with a ball mill was 65 hours. As a result of observation with SEM on the cross sections of the particles of the negative electrode active material, the Si particles were found to have an average particle size of less than 100 nm. As a result of measurement of the contents of elements in the silicate phase through ICP emission spectral analysis, the Li and Si contents were found to be 50 mol % and 50 mol %, respectively.

[Charge/Discharge Cyclic Test]

A charge/discharge cyclic test was carried out on each of the batteries according to Examples and Comparative Examples, in the following manner.

Charge

A constant current charging was carried out at a current of 1 It (800 mA) to a voltage of 4.2 V, and then a constant voltage charging was carried out at a constant voltage of 4.2 V to a current of 1/20 It (40 mA).

Discharge

A constant current discharging was carried out at a current of 1 It (800 mA) to a voltage of 2.75 V.

Quiescent Period

The quiescent period between the charge and discharge described above was 10 minutes.

Charge/Discharge Cycles

The cycle consisting of the charge and the discharge described above was carried out 100 times.

The characteristics of the silicate phase and the result of the capacity retention calculated by the equation below are shown in Tables 1 and 2. A higher capacity retention indicates that the deterioration in the charge/discharge cyclic characteristics was more significantly prevented.

capacity retention(%)=(discharge capacity at 100th cycle/discharge capacity at first cycle)×100

TABLE I

| | Content of Each Component in Silicate Phase (mol %) (mol %) | | | | | | | | | | |
|---|---|---|---|---|---|---|---|---|---|---|---|
| | $Li_2O$ | $SiO_2$ | CaO | MgO | $B_2O_3$ | $Al_2O_3$ | $ZrO_2$ | $TiO_2$ | $P_2O_5$ | $WO_3$ | $La_2O_3$ |
| Example 1 | 22 | 72 | 1 | 0 | 2 | 3 | 0 | 0 | 0 | 0 | 0 |
| Example 2 | 22 | 68 | 0 | 0 | 10 | 10 | 0 | 0 | 0 | 0 | 0 |
| Example 3 | 22 | 48 | 0 | 0 | 15 | 15 | 0 | 0 | 0 | 0 | 0 |
| Example 4 | 22 | 73 | 0 | 5 | 0 | 0 | 0 | 0 | 0 | 0 | 0 |
| Example 5 | 22 | 73 | 0 | 0 | 0 | 0 | 5 | 0 | 0 | 0 | 0 |
| Example 6 | 22 | 73 | 0 | 0 | 0 | 0 | 0 | 5 | 0 | 0 | 0 |
| Example 7 | 22 | 73 | 0 | 0 | 0 | 0 | 0 | 0 | 5 | 0 | 0 |
| Example 8 | 22 | 73 | 0 | 0 | 0 | 0 | 0 | 0 | 0 | 5 | 0 |
| Example 9 | 22 | 73 | 0 | 0 | 0 | 0 | 0 | 0 | 0 | 0 | 5 |
| Example 10 | 21 | 70 | 1 | 0 | 2 | 3 | 0 | 0 | 0 | 0 | 3 |
| Example 11 | 22 | 55 | 2 | 3 | 5 | 5 | 1 | 1 | 5 | 1 | 0 |
| Example 12 | 15 | 65 | 0 | 0 | 10 | 10 | 0 | 0 | 0 | 0 | 0 |
| Example 13 | 8 | 72 | 0 | 0 | 10 | 10 | 0 | 0 | 0 | 0 | 0 |
| Example 14 | 3 | 77 | 0 | 0 | 10 | 10 | 0 | 0 | 0 | 0 | 0 |
| Example 15 | 33 | 47 | 0 | 0 | 20 | 0 | 0 | 0 | 0 | 0 | 0 |
| Comparative Example 1 | 50 | 50 | 0 | 0 | 0 | 0 | 0 | 0 | 0 | 0 | 0 |
| Comparative Example 2 | 33 | 67 | 0 | 0 | 0 | 0 | 0 | 0 | 0 | 0 | 0 |

| | Content of Each Element in Silicate Phase (mol %) (mol %) | | | | | | | | | | | Silicate Phase Vickers Hardness | Time Duration of Grinding Treatment | Capacity Retention |
|---|---|---|---|---|---|---|---|---|---|---|---|---|---|---|
| | Li | Si | Ca | Mg | B | Al | Zr | Ti | P | W | La | H v | h | % |
| Example 1 | 34.6 | 56.7 | 0.8 | 0.0 | 3.1 | 4.7 | 0.0 | 0.0 | 0.0 | 0.0 | 0.0 | 708 | 25 | 86 |
| Example 2 | 28.9 | 44.7 | 0.0 | 0.0 | 13.2 | 13.2 | 0.0 | 0.0 | 0.0 | 0.0 | 0.0 | 742 | 19 | 87 |
| Example 3 | 28.9 | 31.6 | 0.0 | 0.0 | 19.7 | 19.7 | 0.0 | 0.0 | 0.0 | 0.0 | 0.0 | 753 | 18 | 87 |
| Example 4 | 36.1 | 59.8 | 0.0 | 4.1 | 0.0 | 0.0 | 0.0 | 0.0 | 0.0 | 0.0 | 0.0 | 710 | 26 | 86 |
| Example 5 | 36.1 | 59.8 | 0.0 | 0.0 | 0.0 | 0.0 | 4.1 | 0.0 | 0.0 | 0.0 | 0.0 | 740 | 20 | 89 |
| Example 6 | 36.1 | 59.8 | 0.0 | 0.0 | 0.0 | 0.0 | 0.0 | 4.1 | 0.0 | 0.0 | 0.0 | 680 | 32 | 87 |
| Example 7 | 34.6 | 57.5 | 0.0 | 0.0 | 0.0 | 0.0 | 0.0 | 0.0 | 7.9 | 0.0 | 0.0 | 600 | 40 | 88 |
| Example 8 | 36.1 | 59.8 | 0.0 | 0.0 | 0.0 | 0.0 | 0.0 | 0.0 | 0.0 | 4.1 | 0.0 | 650 | 35 | 88 |
| Example 9 | 34.6 | 57.5 | 0.0 | 0.0 | 0.0 | 0.0 | 0.0 | 0.0 | 0.0 | 0.0 | 7.9 | 720 | 20 | 88 |
| Example 10 | 32.6 | 54.3 | 0.8 | 0.0 | 3.1 | 4.7 | 0.0 | 0.0 | 0.0 | 0.0 | 4.7 | 735 | 19 | 87 |
| Example 11 | 32.1 | 40.1 | 1.5 | 2.2 | 7.3 | 7.3 | 0.7 | 0.7 | 7.3 | 0.7 | 0.0 | 733 | 23 | 86 |
| Example 12 | 22.2 | 48.1 | 0.0 | 0.0 | 14.8 | 14.8 | 0.0 | 0.0 | 0.0 | 0.0 | 0.0 | 750 | 17 | 84 |
| Example 13 | 12.5 | 56.3 | 0.0 | 0.0 | 15.6 | 15.6 | 0.0 | 0.0 | 0.0 | 0.0 | 0.0 | 763 | 16 | 82 |
| Example 14 | 4.9 | 62.6 | 0.0 | 0.0 | 16.3 | 16.3 | 0.0 | 0.0 | 0.0 | 0.0 | 0.0 | 770 | 15 | 80 |
| Example 15 | 43.1 | 30.7 | 0.0 | 0.0 | 26.1 | 0.0 | 0.0 | 0.0 | 0.0 | 0.0 | 0.0 | 658 | 35 | 83 |
| Comparative Example 1 | 66.7 | 33.3 | 0.0 | 0 | 0.0 | 0.0 | 0.0 | 0.0 | 0.0 | 0.0 | 0.0 | 481 | 50 | 73 |
| Comparative Example 1 | 50 | 50 | 0 | 0 | 0 | 0 | 0 | 0 | 0 | 0 | 0 | 544 | 50 | 76 |

As is clear from Table 2, the deterioration in the charge/discharge cyclic characteristics was significantly prevented in the batteries according to Examples 1 to 15 co pared to those of Comparative Examples 1 and 2. The average particle size of Si particles was less than 100 nm in all Examples and Comparative Examples. However, the time duration of the grinding treatment with a ball mill in each Example was shorter than those in Comparative Examples. This means that the time necessary for reaching a prescribed grinding level is shorter when a negative electrode active material is prepared from a silicate produced in Example than that when a negative electrode active material is prepared from a silicate produced in Comparative Example.

REFERENCE SIGNS LIST

10 particle of negative electrode active material
11 lithium silicate phase
12 silicon particle
13 base particle
14 conductive layer

The invention claimed is:

1. A negative electrode active material for a non-aqueous electrolyte secondary battery, comprising base particles,
each of the base particles comprising: a silicate phase including Li, Si, $M^x$, wherein $M^x$ is one or more elements other than an alkali metal, an alkaline earth metal, and Si and is selected from the group consisting of B, Bi, Sb, Ge, Zr, P, V, W and La,
wherein, in the silicate phase, a Li content is 3 to 45 mol %, a Si content is 40 to 78 mol %, and an $M^x$ content is 1 to 40 mol %, each based on the total amount of elements in the silicate phase other than oxygen.

2. The negative electrode active material for a non-aqueous electrolyte secondary battery according to claim 1, wherein
the silicate phase includes an alkaline earth metal M, and in the silicate phase, an M content is 1 to 5 mol % based on the total amount of elements other than oxygen.

3. The negative electrode active material for a non-aqueous electrolyte secondary battery according to claim 1, wherein, in the silicate phase, the Li content is 5 to 23 mol %, the Si content is 45 to 78 mol %, and the $M^x$ content is 2 to 35 mol %, each based on the total amount of elements other than oxygen.

4. The negative electrode active material for a non-aqueous electrolyte secondary battery according to claim 1, wherein $M^x$ includes at least one of B, Zr, P, La, and W.

5. The negative electrode active material for a non-aqueous electrolyte secondary battery according to claim 4, wherein $M^x$ includes at least one of B and Zr.

6. The negative electrode active material for a non-aqueous electrolyte secondary battery according to claim 1, wherein a conductive layer is formed on a surface of the base particle.

7. A non-aqueous electrolyte secondary battery comprising: a negative electrode including the negative electrode active material for a non-aqueous electrolyte secondary battery according to claim 1, a positive electrode, and a non-aqueous electrolyte.

8. The negative electrode active material for a non-aqueous electrolyte secondary battery according to claim 1, wherein $M^x$ further includes at least one of Al and Ti.

* * * * *